Aug. 23, 1960

A. M. MOEN 2,949,933

VALVE STRUCTURE

Filed Jan. 7, 1957

INVENTOR.
ALFRED M. MOEN
BY
Robinson & Berry
ATTORNEYS

Aug. 23, 1960     A. M. MOEN     2,949,933
VALVE STRUCTURE

Filed Jan. 7, 1957     3 Sheets-Sheet 2

INVENTOR.
ALFRED M. MOEN
BY
Robinson & Berry
ATTORNEYS

Aug. 23, 1960   A. M. MOEN   2,949,933
VALVE STRUCTURE
Filed Jan. 7, 1957   3 Sheets-Sheet 3
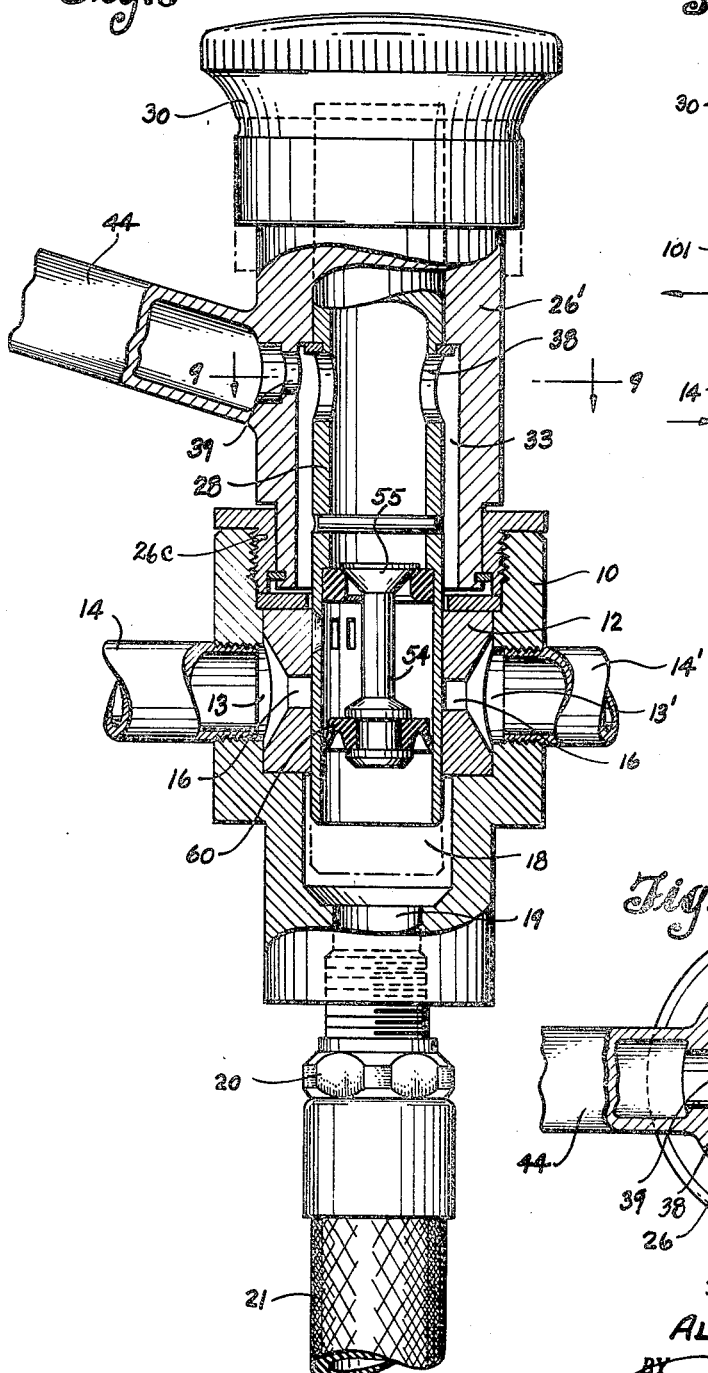
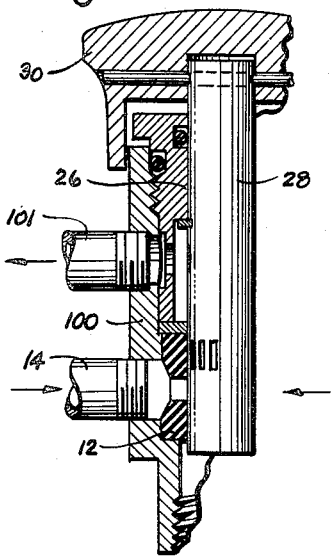
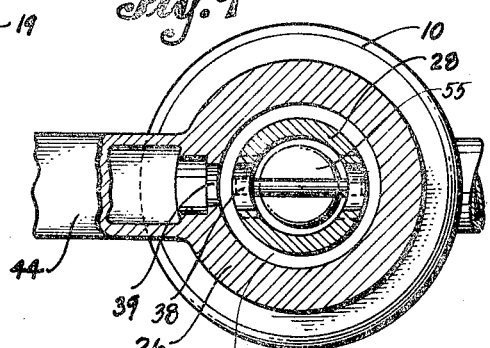
INVENTOR.
ALFRED M. MOEN
BY
Robinson & Berry
ATTORNEYS

2,949,933
VALVE STRUCTURE

Alfred M. Moen, Rte. 1, 151 Lakeview Drive, Grafton, Ohio

Filed Jan. 7, 1957, Ser. No. 632,757

3 Claims. (Cl. 137—625.17)

This invention relates to valve structures and controlling or adjusting means therefor, and it has reference more particularly to hot and cold water mixing valves suitable for use in faucets equipped with a single means by which both flow and mixture of hot and cold water can be placed under easy finger tip control.

It is the primary object of this invention to provide a novel, practical, compact, simple and easily operable valve structure of the above stated character, especially suited for sink and lavatory installations where both hot and cold water is used, and which is characterized by use therein of a movable valve element of tubular form that is rotatably and longitudinally adjustable to control flow and mixture, and which is adjustable within an enclosing sleeve of resilient material, formed with passages through which water under pressure is admitted to the valves and which sleeve is acted on exteriorly by the supply line pressures to automatically maintain a water sealed connection between it and the movable valve element.

It is also an object of this invention to provide the present valve structure with a novel and improved diverter valve mechanism that will act automatically to divert outflow from a principal discharge passage to an auxiliary discharge passage upon manual opening of a control valve that is associated with the auxiliary passage.

Further objects and advantages of the invention reside in the details of construction of parts embodied therein; in their combination and in their mode of operation, as will hereinafter be fully described.

In accomplishing the above mentioned and other objects of the invention, I have provided the improved details of construction, the preferred forms of which are illustrated in the accompanying drawings, wherein:

Fig. 7 is a view showing the present valve mechanism with a spray head associated therewith, and to which water will be automatically diverted upon the opening of the discharge valve of the spray head.

Fig. 8 is a side view of another valve mechanism embodied by the present invention, shown partly in longitudinal section, wherein the discharge spout extends from the plug body which is rotatably mounted.

Fig. 9 is a cross-section on line 9—9 in Fig. 8.

Fig. 10 is a sectional detail of still another valve structure embodied by this invention.

Referring more in detail to the drawings:

In its present preferred form, the valve structure embodied by this invention comprises a valve housing 10 that is formed coaxially thereof with a cylindrical valve chamber 11 in which a lining sleeve 12 is fitted and secured; this sleeve being of cylindrical form, of substantial thickness and composed of a resilient material such as neoprene or other special forms of rubber or rubber-like material.

The valve housing 10 is provided at opposite sides with water inlet ports and 13—13' to which water supply pipes 14 and 14' for hot and cold water, respectively, are connected.

Figure 3:
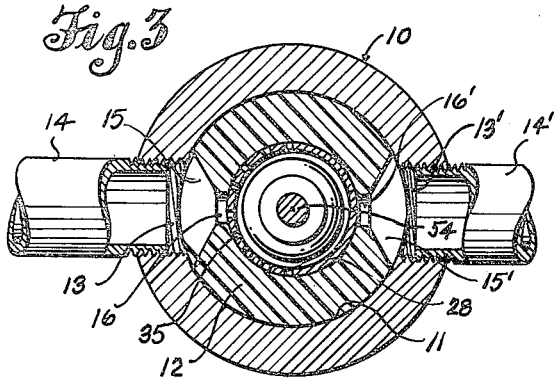
Fig. 3 is a horizontal section taken on the line 3—3 in Fig. 1 with the main valve in open position.

The sleeve 12, as applied to the valve chamber 11, overlies the inlet ports 13 and 13' and it is formed exteriorly with shallow and circumferentially directed recesses 15 and 15' which register respectively with the inlet ports 13 and 13', and from the bottoms of which recesses, ports 16—16' open inwardly through the sleeve as noted in Fig. 3, and both are at the same horizontal level.

Figure 1:
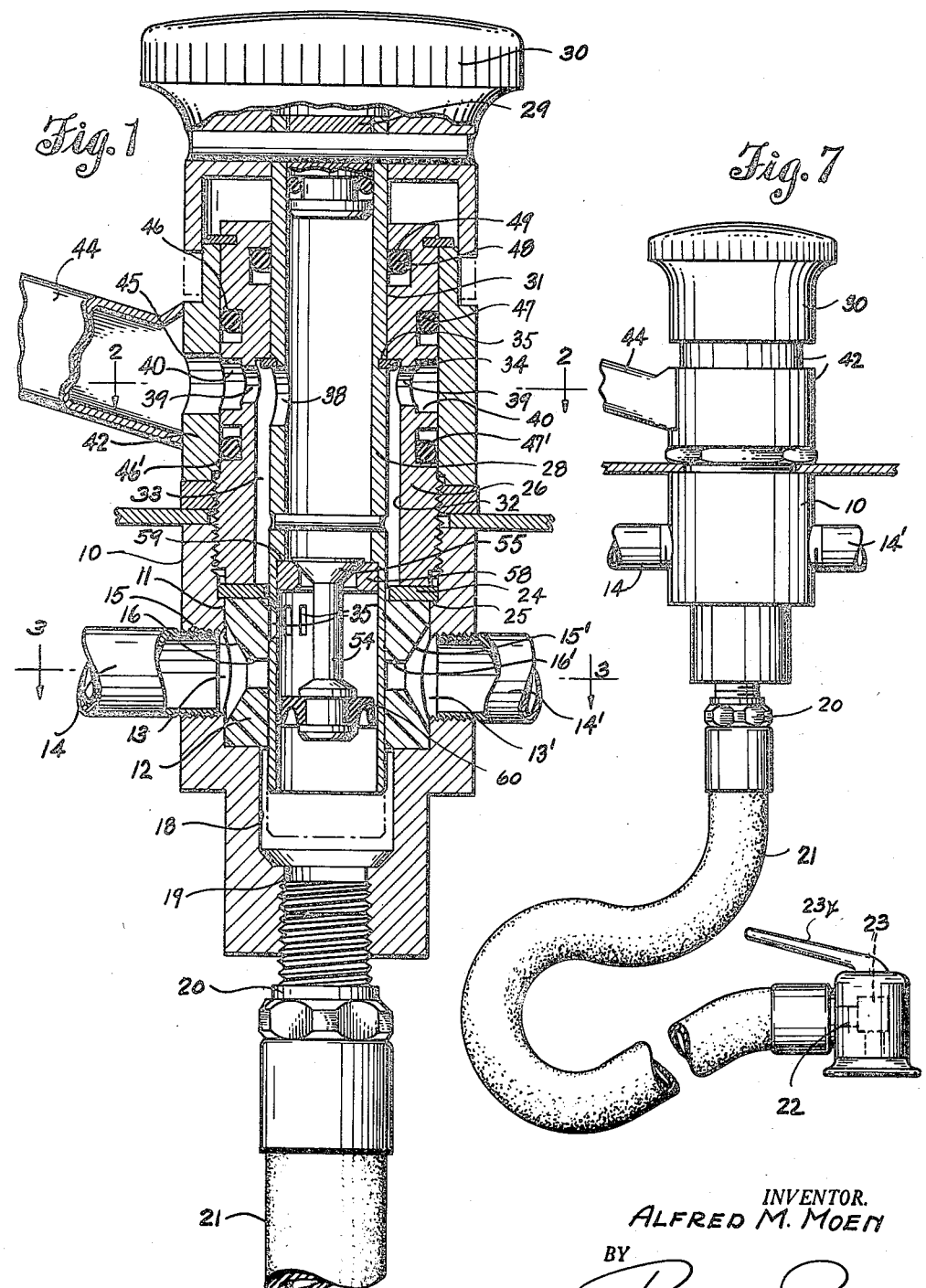
Fig. 1 is a sectional view of a valve mechanism, embodied by the present invention, taken in the plane of its axial line and showing the flow and mixture control valve in its closed position.
Figure 2:
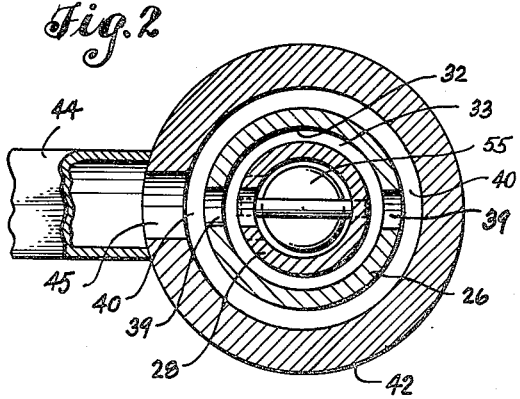
Fig. 2 is a horizontal section of the same taken on the line 2—2 in Fig. 1.
Figure 5:
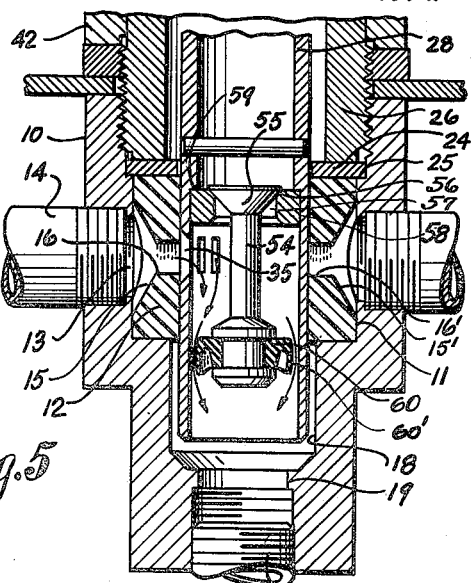
Fig. 5 is a sectional detail showing the diverter valve as actuated to its diverting position.
Figure 4:
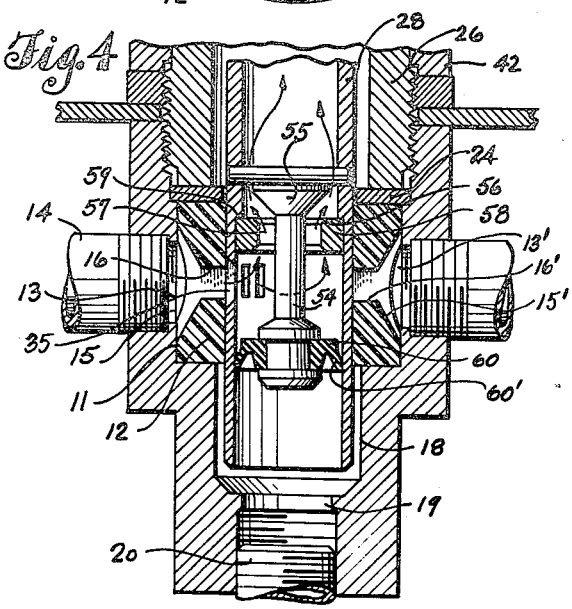
Fig. 4 is a vertical sectional view showing the main valve in an open position of adjustment.

It is shown in Fig. 1 that a bore 18 of substantially lesser diameter than the valve chamber 11 continues downwardly from the lower end of the chamber 11, and from the lower end of this another bore 19 is extended to the lower end of the housing 10, and this has a hose fitting 20 threaded thereinto. A flexible hose 21 is attached to the fitting 20, and this leads to a spray head 22, or the like, as shown in Fig. 4. This spray head is equipped with a discharge valve as designated at 23 in Fig. 7, that is controlled by a hand lever 23x.

It is also shown in Fig. 1 that the resilient sleeve 12 is seated at its lower end against the lower end surface of chamber 11 and that its inside diameter is slightly less than the diameter of bore 18. A flat washer 24 rests against the flat upper end surface of the sleeve 12 with its outer peripheral edge rested against a narrow upwardly facing shoulder 25 formed in the housing at the upper end of the chamber 11. A spout and valve stem mounting plug 26 is threaded into the upper end of the housing 10, coaxial of the chamber 11, with its lower end tightened against the washer 24 thus holding the sleeve 12 in place.

Extended coaxially through the plug 26, with its lower end portion fitted in and extended downwardly through the sleeve 12 and into the lower end bore 18 of the housing 10, is a tubular valve member 28. This movable valve member extends above the upper end of the plug and is sealed at that end by a plug 29 that is fitted and secured therein. Also, at its upper end, the tubular valve member 28 is equipped with a knob 30, which is knurled or otherwise appropriately shaped for easy finger tip grasping for effecting the rotary or longitudinal adjustment thereof as presently explained.

The plug portion 26 extends substantially above the housing 10 into which it is threaded, and in its upper end portion it is formed with an axial bore 31 within which the valve tube 28 is fitted for easy sliding and rotary adjustment. The lower end portion of the plug 26 is formed with an axial bore 32, of greater diameter than the valve tube 28 and thus provides an annular chamber 33 between them. A snap ring 34 is applied to an encircling channel 35 in the tube 28, which ring is adapted to engage against the upper end wall of chamber 33 to limit the upward adjustment of the valve tube in the plug. The downward adjustment of the valve tube is limited by the knob 30 contacting with the upper end of the plug 26.

It is shown in Figs. 1 and 4 that a portion of tube 28 contained in sleeve 12 is formed with a circumferentially directed row of vertical slots 35 extending through an arc of 180°. When the valve tube 28 is moved to its lower limit of adjustment as in Fig. 4, it can be rotatably adjusted to cause slots 35 to register only with either the hot or the cold water inlet of the sleeve 12, thus to obtain an inflow of all hot or all cold water. Also, it can be rotatably adjusted to cause the slots to be registered to various extent with both inlets 16—16' thus to obtain a mixture of hot and cold water, which mixture can range from one extreme to the other according to the rotary adjustment that is made.

In its upper end portion and below the snap ring 34, the valve tube 28 has a discharge port 38 opening therefrom into chamber 33, and from the upper end of the chamber 33 a plurality of discharge ports 39 open into an annular channel 40 formed in and about the plug. Fitted to the plug 26, for rotation thereon, is a sleeve 42 which is equipped with a discharge spout 44. A port 45 is formed in the sleeve wall, in registration with the channel 40 and opening into the spout, thus providing that the spout can be swung to various positions of use without interference with its water receiving connection.

To seal the spout equipped sleeve 42 against leakage, the plug 26 is formed exteriorly above and below the encircling channel 40 with encircling channels 46—46' in which O-ring sealing gaskets 47—47' are retained by sleeve 42 under compression. Likewise, an O-ring sealing gasket 48 is fitted in a channel 49 formed in the walls of bore 31 to seal the bore against leakage from chamber 33 along the tube 28.

With the parts of the valve structure so arranged, it will be understood that supply line water pressure acting against the outside of the resilient sleeve 12 causes the sleeve to be pressed tightly at all times against the valve tube thus to insure a water tight joint between them, and to avoid any leakage that might result from wear on the parts. Furthermore, it will be understood that, by reason of the resiliency of the sleeve 12, any misalignment of sleeves 12 and 28 from any cause, will be readily compensated for.

The adjustable valve member 28 will be retained frictionally at any position to which it is adjusted, by the pressure of the sleeve 11 thereagainst supplemented by the pressure of sealing gasket 48. When the tube 28 is pulled to its upper limit, the slots 35 will be moved out of registration with inlets 16—16' and no water can then flow into or through the valve. By pressing the tube 28 downwardly from its closed position of Fig. 1, the slots 35 can be registered to more or less extent with the inlets 16—16' to admit water to the valve, and then by a rotative adjustment, proportionate amounts of hot and cold water can be admitted as may be desired.

It is further anticipated that in such faucets, the slots 35 can be so positioned in the tube 28 that the valve is opened by pulling the tube upwardly and closed by pushing it downwardly.

It is also anticipated that in lieu of the use of the knob 30 for manually making valve adjustments, a handle of other type, or linkage or levers of various arrangments might be employed for the purpose.

In addition to the features above described, the present valve structure also embodies therein a diverter valve device whereby, upon the manual opening of the control valve 23 of spray head 22 for outflow, the outflow to the spout 44 through the diverter will be automatically shut off. The diverter valve mechanism as contained coaxially within the lower end portion of the valve tube 28, comprises a stem portion 54, formed at its upper end with a conical, downwardly facing valve head 55 adapted to move upwardly from or downwardly against a seat 56 about a passage 57 in a neoprene ring 58 that is slidably fitted in the tube 28 above the slots 55 as provided therein; this ring being limited in its upward movement by its engaging against an annular, downwardly facing shoulder 59 formed in the tube 28.

At its lower end the stem 54 is equipped with a piston 60 which at all positions of its movement is below the tube slots 35. The piston is of lesser diameter than the inside diameter of the tube containing it, but it is formed with a flexible, downwardly flaring skirt portion 60' which can be readily pressed against the tube walls by back pressure of liquid against its underside.

It will be understood that, with the valve sleeve 28 adjusted downwardly to any open position, and the outflow through hose 21 checked by the closed valve 23 of the spray head 22, the water that passes the piston causes pressure to be built up against the underside thereof which balances that against its top side. Thus, the pressure of entering water against the valve head 55 moves it upwardly to open position and outflow is permitted to and through the spout 44. However, when the valve 23 in the spray head 22 is opened, the balancing pressure against the underside of piston 60 is so reduced that pressure of incoming water against the top side of the piston moves the stem 54 downwardly and closes the valve 55 against the ring 58, and discharge is then through the hose 21 to and through the spray head.

The diverter valve mechanism also operates as a syphoning or suction breaking means. In the event that supply line pressure should be cut off while the valve 28 is left open, suction in the pipe lines 14—14' could cause water to be drawn back into the supply system through hose 21. To prevent this possibility, the piston skirt 60' is made to seal against the inner surface of the tube 28 and the neoprene ring 58 is slidably fitted therein. Thus, if suction does take place while valve is open, the ring 58 will be drawn downwardly away from valve head 55 to open the seat 56 thus to admit outside air and eliminate suction through the tube 21.

Figure 6:
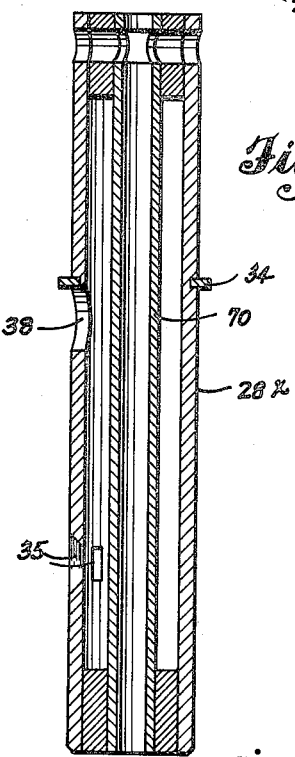
Fig. 6 is a longitudinal sectional view of a valve member on an alternative form.

In Fig. 6, I have illustrated a modified form of valve tube. In using a tube of this kind, it is applied and used in the same manner as the tube 28. However, the diverter valve mechanism is not employed therein, and the bore 18 of housing 10 is closed at its lower end. The tube of Fig. 6 is designated by numeral 28x. It is substantially like tube 28 previously described except that it is closed at both ends and is equipped from end to end with a small relief tube 70 for the escape of water which might become trapped in the bore 18 which is closed at its lower end. This relief tube permits the assembly 28x to be completely pressure balanced.

While the present invention has been illustrated and described as applied to a faucet wherein the spout 44 extends from a sleeve that is rotatably fitted to the plug 26, it is applicable also to structures from which the sleeve has been eliminated, as has been illustrated in Fig. 8.

In Fig. 8 parts that are like those shown and described in connection with Fig. 1, have been given like reference numerals and will not be further described, but it is shown therein that the spout 44 extends from a part 26' which corresponds to plug 26 but which, at its lower end is swively sealed in a collar 26c that is threaded into the upper end of the housing chamber 11. This collar engages the ring 24 and retains the sleeve 12 in place.

In Fig. 10, I have shown still another construction, designated as of "shower type" comprising a one piece housing 100 which as indicated would be equipped at its lower end with hot and cold water inlets as in the structure of Fig. 1, but with a discharge pipe 101 leading from the housing at a higher level. This construction includes the resilient sleeve 12, valve 28 and plug elements 26 corresponding to those equivalent parts shown in the device of Fig. 1. Also, the valve member 28 is equipped with a knob 30 for its adjustment as in the devices previously described, and it may or may not contain the diverter.

What I claim as new is:

1. A mixing valve comprising a valve housing, a valve chamber in said housing, said valve chamber having a plurality of water supply lines opening thereinto and a discharge port leading therefrom, a valve cylinder of resiliently yieldable, rubber-like material within said valve chamber, inlet ports formed in the sidewall of said valve cylinder and registering with the water supply lines, a tubular valve member, said valve member being rotatably and longitudinally movable in said valve cylinder, an inlet port formed in the tubular valve member, said inlet port being adjustable into and from registration with said cylinder ports to more or less extent to control mixture and flow through the valve, means secured to said tubular valve member, exterior of the valve housing, for effecting adjustment of the valve member, pressure responsive areas on the external surface of said valve cylinder surrounding the inlet ports thereof whereby the pressure of fluid in the supply lines will exert pressure on pressure responsive areas of the cylinder surrounding said inlet ports and cause the internal surface of the cylinder to seal against said tubular valve member.

2. A mixing valve as in claim 1 wherein said pressure responsive areas of the valve cylinder are of reduced thickness to provide a relatively thin section surrounding the inlet ports thereof.

3. A mixing valve as in claim 1 wherein the area of said inlet ports in said valve cylinder is substantially smaller than the area of said water supply lines so that the difference in areas define said pressure responsive areas on the valve cylinder.

References Cited in the file of this patent

UNITED STATES PATENTS

| | | |
|---|---|---|
| 262,935 | Dibble | Aug. 22, 1882 |
| 1,126,478 | Joyce | Jan. 26, 1915 |
| 2,132,030 | Hunt | Oct. 4, 1938 |
| 2,223,636 | Mullen | Dec. 3, 1940 |
| 2,556,780 | Shyrock | June 12, 1951 |
| 2,684,691 | Strickler | July 27, 1954 |
| 2,769,454 | Bletcher | Nov. 6, 1956 |
| 2,845,948 | Parker | Aug. 5, 1958 |

FOREIGN PATENTS

| | | |
|---|---|---|
| 184,261 | Switzerland | Nov. 16, 1936 |